(12) United States Patent
Tang

(10) Patent No.: US 10,555,233 B2
(45) Date of Patent: Feb. 4, 2020

(54) DEVICE AND METHOD OF HANDLING TRANSMISSIONS

(71) Applicant: HTC Corporation, Taoyuan (TW)

(72) Inventor: Chien-Hsin Tang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 157 days.

(21) Appl. No.: 15/865,282

(22) Filed: Jan. 9, 2018

(65) Prior Publication Data

US 2018/0199255 A1   Jul. 12, 2018

Related U.S. Application Data

(60) Provisional application No. 62/444,292, filed on Jan. 9, 2017.

(51) Int. Cl.
| | |
|---|---|
| *H04W 36/26* | (2009.01) |
| *H04W 36/06* | (2009.01) |
| *H04L 1/18* | (2006.01) |
| *H04W 4/70* | (2018.01) |
| *H04W 76/15* | (2018.01) |
| *H04L 1/16* | (2006.01) |
| *H04W 88/06* | (2009.01) |

(52) U.S. Cl.
CPC .......... *H04W 36/26* (2013.01); *H04L 1/1671* (2013.01); *H04L 1/18* (2013.01); *H04L 1/1819* (2013.01); *H04W 4/70* (2018.02); *H04W 36/06* (2013.01); *H04W 76/15* (2018.02); *H04W 88/06* (2013.01)

(58) Field of Classification Search
CPC ..... H04W 36/26; H04W 76/15; H04W 36/06; H04W 4/70; H04W 88/06; H04L 1/1671; H04L 1/1819; H04L 1/18
See application file for complete search history.

(56) References Cited

U.S. PATENT DOCUMENTS

| | | | | |
|---|---|---|---|---|
| 10,256,956 | B2 * | 4/2019 | Zhang | H04B 7/2621 |
| 10,348,453 | B2 * | 7/2019 | Webb | H04L 1/08 |
| 2006/0075319 | A1 * | 4/2006 | Ratasuk | H04L 1/0001 714/752 |
| 2013/0021969 | A1 * | 1/2013 | Ho | H04L 1/1819 370/328 |
| 2013/0242824 | A1 * | 9/2013 | Lee | H04L 1/1819 370/281 |
| 2018/0295190 | A1 * | 10/2018 | Lu | H04L 67/141 |
| 2019/0053315 | A1 * | 2/2019 | Yiu | H04L 1/188 |

OTHER PUBLICATIONS

3GPP TS 36.213 V14.1.0, Dec. 2016.

* cited by examiner

*Primary Examiner* — Mounir Moutaouakil
(74) *Attorney, Agent, or Firm* — Winston Hsu

(57) ABSTRACT

A communication device of handling transmissions comprises a storage device; and a processing circuit, coupled to the storage device, wherein the storage device stores, and the processing circuit is configured to execute instructions of: performing a first transmission comprising a first data and an identity of the communication device with a network via a first resource; and performing a second transmission comprising a second data and the identity of the communication device with the network via a second resource.

19 Claims, 7 Drawing Sheets

//DEVICE AND METHOD OF HANDLING TRANSMISSIONS

CROSS REFERENCE TO RELATED APPLICATIONS

This application claims the benefit of U.S. Provisional Application No. 62/444,292 filed on Jan. 9, 2017, which is incorporated herein by reference.

BACKGROUND OF THE INVENTION

1. Field of the Invention

The present invention relates to a device and a method used in a wireless communication system, and more particularly, to a device and a method of handling transmissions.

2. Description of the Prior Art

A user equipment (UE) may perform a transmission with a network via a resource used by other UE(s). The UE may consider that the transmission is not performed successfully, when the UE does not receive a message responding to the transmission from the network. It is unknown how the UE to handle the transmission with the network, when the UE considers that the transmission is not performed successfully. Thus, transmission(s) between the UE and the network may not be performed properly.

SUMMARY OF THE INVENTION

The present invention therefore provides a communication device and method for handling transmissions to solve the abovementioned problem.

A communication device of handling transmissions comprises a storage device; and a processing circuit, coupled to the storage device, wherein the storage device stores, and the processing circuit is configured to execute instructions of: performing a first transmission comprising a first data and an identity of the communication device with a network via a first resource; and performing a second transmission comprising a second data and the identity of the communication device with the network via a second resource.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
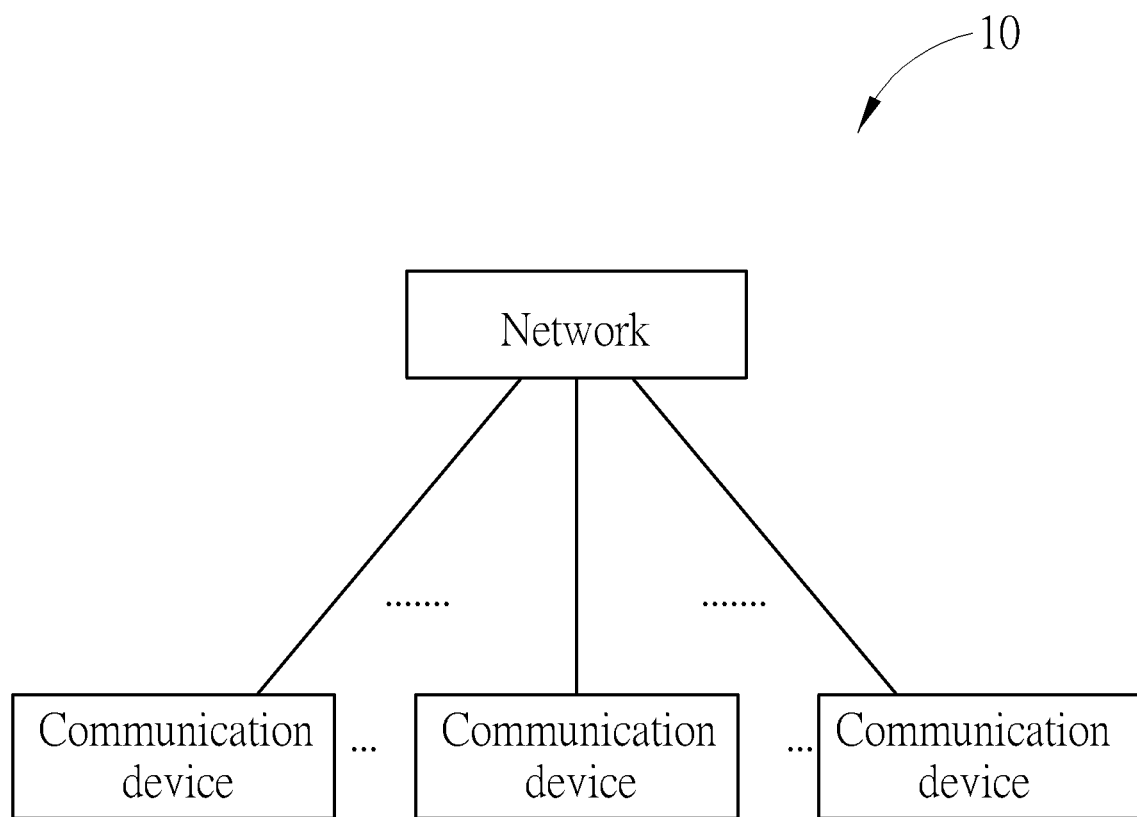
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers. The network and the communication device may simultaneously communicate with each other via one or multiple cells (e.g., one or multiple carriers) belonging to one or multiple base station (BS). The abovementioned cells may be operated in the same or different duplexing modes, i.e., frequency-division duplexing (FDD), time-division duplexing (TDD) and flexible duplexing. In addition, the communication devices may communicate with the network according to a grant-free (or called autonomous, contention-based) procedure.

In FIG. 1, the network and the communication devices are simply utilized for illustrating the structure of the wireless communication system 10. Practically, the network may be an evolved universal terrestrial radio access network (E-UTRAN) including at least one evolved Node-B (eNB) in a long term evolution (LTE) system, a LTE-Advanced (LTE-A) system, an evolution of the LTE-A system. The network may be a fifth generation (5G, or called new radio (NR)) network including at least one 5G BS (e.g., gNB). The 5G network employs orthogonal frequency-division multiplexing (OFDM) and/or non-OFDM. The 5G network supports a transmission time interval (TTI) shorter than 1 ms (e.g., 1, 2, 3 or 4 OFDM symbols, or 100 or 200 microseconds), and supports a system bandwidth wider than 20 MHz, to communicate with the communication devices. In general, a BS may also be used to refer any of the eNB and the 5G BS.

A communication device may be a user equipment (UE), a massive machine type communication (mMTC) UE, a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
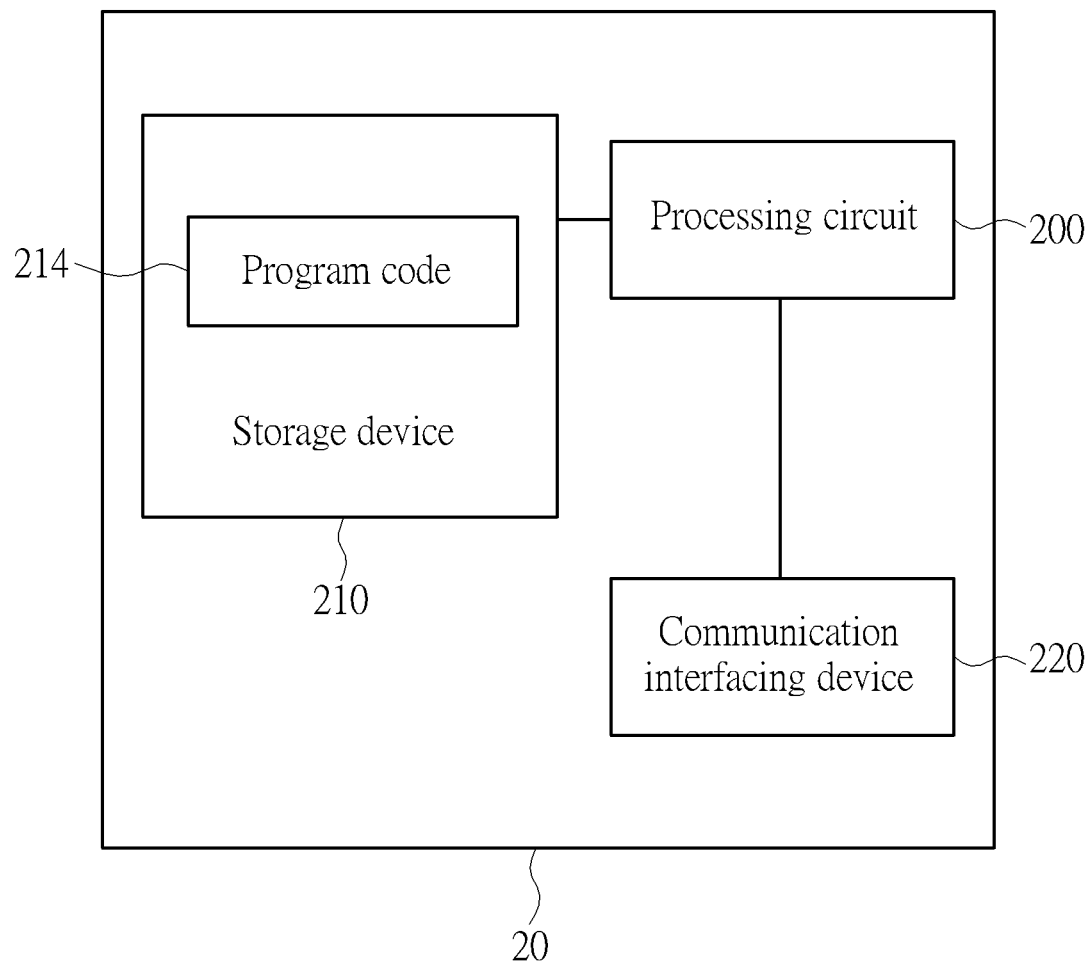
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver used to transmit and receive signals (e.g., data, messages and/or packets)

according to processing results of the processing circuit 200. The BS may belong to (e.g., is managed/controlled by) the network to perform steps or instructions for realizing the following examples.

In the following examples, a UE is used for representing a communication device in FIG. 1, to simplify the illustration of the examples.

Figure 3:
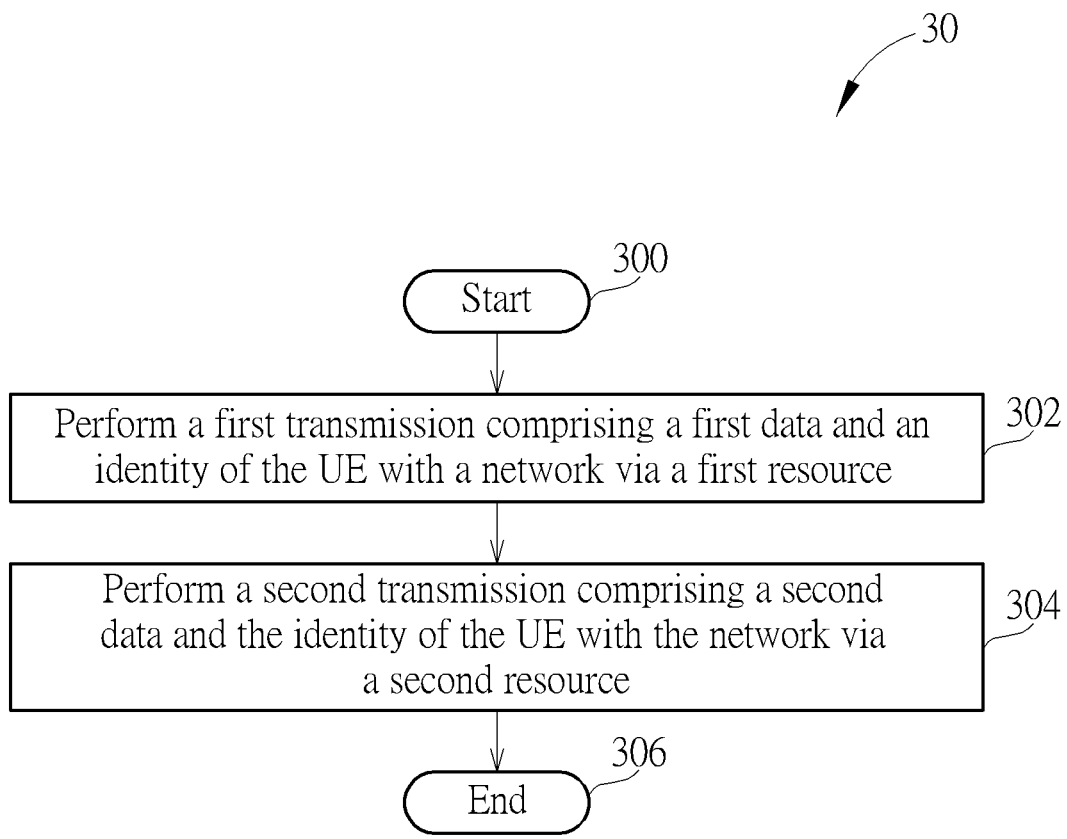
FIG. 3 is a flowchart of a process according to an example of the present invention.

FIG. 3 is a flowchart of a process 30 according to an example of the present invention. The process 30 may be utilized in a UE, to handle transmissions. The process 30 includes the following steps:

Step 300: Start.

Step 302: Perform a first transmission comprising a first data and an identity of the UE with a network via a first resource.

Step 304: Perform a second transmission comprising a second data and the identity of the UE with the network via a second resource.

Step 306: End.

According to process 30, the UE performs a first transmission including a first data and an identity of the UE (e.g., UE ID) with a network via a first resource (e.g., a multiple access (MA) resource including a MA signature and a time-frequency resource, or a time-frequency resource). Then, the UE performs a second transmission including a second data and the identity of the UE with the network via a second resource. That is, how the UE performs the transmissions with the network is defined according to the process 30.

Realization of the process 30 is not limited to the above description. The following examples may be applied to the process 30.

A non-orthogonal multiple access (NOMA) is discussed for a scenario of a grant-free procedure. In the NOMA, the UE may perform the grant-free procedure via resources which are not necessarily orthogonal to each other, e.g., the MA signature in the process 30. In one example, the MA signature may be at least one orthogonal code, or at least one spreading code.

In one example, the second transmission may be a retransmission of the first transmission, if the UE receives a negative acknowledgement (NACK) of the first transmission from the network. That is, the UE performs the retransmission of the first transmission, after receiving the NACK of the first transmission.

In one example, the UE may perform the first/second transmission according to (e.g., by using) a hybrid automatic repeat request (HARQ) process (e.g., mechanism). In one example, a first redundancy version (RV) of the first data may be corresponding to (e.g., used for) the first transmission. That is, the first transmission includes the first RV of the first data. In one example, a second RV of the second data may be corresponding to (e.g., used for) the second transmission. That is, the second transmission includes the second RV of the second data. In one example, a sequence of RVs for the HARQ process may be {0, 2, 3, 1}. Accordingly, the first/second transmission may be an initial transmission, if the first/second RV is RV 0 (i.e., the first/second transmission includes RV 0 of the first/second data). The first/second transmission may be a first retransmission, if the first/second RV is RV 2 (i.e., the first/second transmission includes RV 2 of the first/second data). The first/second transmission may be a second retransmission, if the first/second RV is RV 3 (i.e., the first/second transmission includes RV 3 of the first/second data). The first/second transmission may be a third retransmission, if the first/second RV is RV 1 (i.e., the first/second transmission includes RV 1 of the first/second data).

In one example, the first transmission may be an initial transmission, and the second transmission may be a retransmission of the first transmission. The retransmission of the first transmission may be performed by transmitting data of the first transmission (i.e., the second data is the first data) with a new (e.g., neighboring, next) RV (e.g., RV 2 according to above example) different from the first RV (e.g., RV 0).

In one example, the first resource may be included in a first resource group corresponding to (e.g., used for) the first transmission. In one example, the second resource may be included in a second resource group corresponding to (e.g., used for) the second transmission. That is, different resource groups are separately used for different transmissions which are corresponding to (e.g., represent) different number of retransmissions for a HARQ process. Accordingly, the network may know the number of retransmissions of the first/second transmission by identifying to which resource group the first/second resource belongs.

In one example, the first resource may have a correspondence with (e.g., be mapped to) at least one resource in the second resource group. The second resource used in the second transmission may be one of the at least one resource mapped by the first resource (e.g., the UE selects the second resource from the at least one resource, which is mapped by the first resource, in the second transmission randomly.) In one example, the correspondence may be configured by the network via system information or a radio resource control (RRC) message. In a scenario of a grant-free procedure, the UE and other UE(s) may use the same resource (e.g., the first resource) to perform transmissions. A benefit of the correspondence (e.g., one-to-many correspondence) is that the UE may have more chances to use a resource (e.g., one of the at least one resource, which is mapped by the first resource, in the second resource group) which is different from other resource(s) (e.g., other resource(s) of the at least one resource, which is mapped by the first resource, in the second resource group) used by the other UE(s), so as to perform retransmissions, when a resource collision occurs in the transmissions.

In one example, the second resource may be selected by the UE from at least one resource in the second resource group randomly, wherein the at least one resource is mapped by the first resource. In one example, the second resource may be configured by the network via the NACK of the first transmission or a physical DL control channel (PDCCH). The above two examples may be combined to form another example. For example, the first resource may include a first MA signature and a first time-frequency resource, and the second resource may include a second MA signature and a second time-frequency resource. The first MA signature may be in a first MA signature group, and the second MA signature may be in a second MA signature group. In one example, the first MA signature in the first MA signature group may have a correspondence with (e.g., be mapped to) at least one MA signature in the second MA signature group. In one example, the correspondence may be configured by the network via system information or a RRC message.

In the first retransmission, the second MA signature may be selected by the UE from the at least one MA signature in the second MA signature group, which is mapped by the first MA signature, randomly (i.e., the second MA signature is one of the at least one MA signature, which the first MA signature is mapped to). The second time-frequency resource may be configured by the network. The UE performs the first retransmission with the network via the second MA signature and the second time-frequency resource. The abovementioned MA signature group may refer to that the network may pre-divide all available MA signatures to different groups. The different groups may be separately used for different transmissions which are corresponding to (e.g., represent) different number of retransmissions for a HARQ process.

In one example, the first resource group and the second resource group may be configured by the network via system information or a RRC message. In one example, the first resource group may be corresponding to the first RV. In one example, the second resource group may be corresponding to the second RV. That is, different resource groups are corresponding to (e.g., pre-mapped to) different RVs.

In one example, the second transmission may be an initial transmission, if the UE does not receive an acknowledgement (ACK) of the first transmission and does not receive a NACK of the first transmission from the network. In one example, the first transmission may be the initial transmission, and the second transmission may be the initial transmission. That is, the second transmission is performed by repeating the first transmission. Accordingly, a first RV of the first data and a second RV of the second data are corresponding to the initial transmission, i.e., the first RV of the first data and the second RV of the second data may be the same. The first resource and the second resource are corresponding to the initial transmission.

In one example, the second transmission may be an initial transmission, if the UE receives an ACK of the first transmission from the network and does not receives the identity of the UE from the network. For example, the UE receives an identity of another UE related to the ACK from the network (i.e., the UE is not addressed by the ACK). In one example, the first transmission may be the initial transmission, and the second transmission may be the initial transmission. That is, the second transmission is performed by repeating the first transmission. Accordingly, a first RV of the first data and a second RV of the second data are corresponding to the initial transmission, i.e., the first RV of the first data and the second RV of the second data may be the same. The first resource and the second resource are corresponding to the initial transmission.

In one example, the second transmission may be a new transmission different from the first transmission, if the UE receives an ACK of the first transmission and the identity of the UE from the network. That is, the UE considers that the transmission is performed successfully, and performs the new (e.g., another) transmission. Accordingly, the first data and the second data may be different data. The first resource and the second resource may be corresponding to different transmissions.

In one example, the identity of the UE may be included in the ACK of the first transmission. In one example, the identity of the UE may be encoded with the ACK of the first transmission. In one example, the identity of the UE may be transmitted separately (e.g., in a message different) from the ACK of the first transmission.

In one example, the identity of the UE may be configured by the network. In one example, the identity of the other UE(s) may be configured by the network. In one example, the identities may be configured by the network, respectively.

Figure 4:
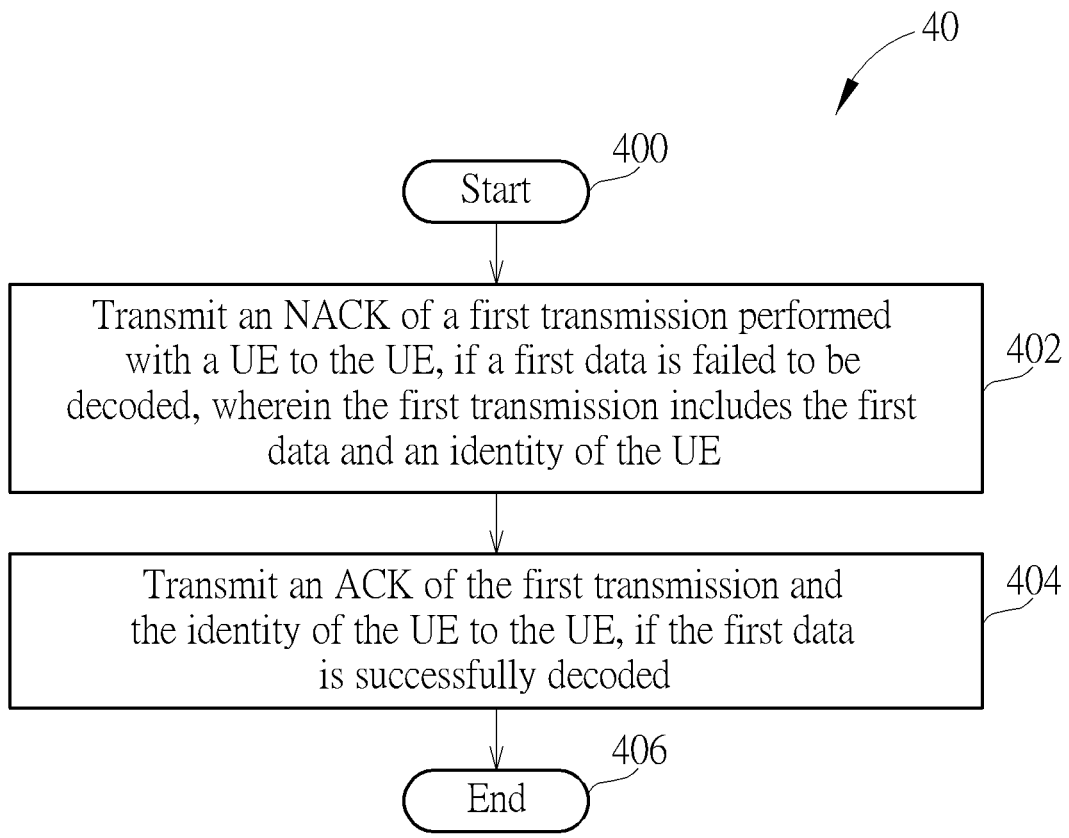
FIG. 4 is a flowchart of a process according to an example of the present invention.

FIG. 4 is a flowchart of a process 40 according to an example of the present invention. The process 40 may be utilized in a network, to handle transmissions. The process 40 includes the following steps:

Step 400: Start.

Step 402: Transmit an NACK of a first transmission performed with a UE to the UE, if a first data is failed to be decoded, wherein the first transmission includes the first data and an identity of the UE.

Step 404: Transmit an ACK of the first transmission and the identity of the UE to the UE, if the first data is successfully decoded.

Step 406: End.

According to process 40, the network transmits an NACK of a first transmission performed with a UE to the UE (e.g., via MA resource, or time-frequency resource), if a first data is failed to be decoded, wherein the first transmission includes the first data and an identity of the UE. The network transmits an ACK of the first transmission and the identity of the UE to the UE, if the first data is successfully decoded. That is, the network responds the first transmission according to whether the first data is successfully decoded.

Realization of the process 40 is not limited to the above description. The following examples may be applied to the process 40.

In one example, the network determines (e.g., detects) resources possibly used by the UE in the first transmission, and measures a signal to noise ratio (SNR) of each of the resources via a reference signal (RS). The network may determine that the first resource includes the first transmission, when the SNR of the first resource is the highest. Then, the network decodes the first data and performs Step 402 or Step 404 according to whether the first data is successfully decoded.

In one example, the first transmission is an initial transmission. In one example, the first transmission is a retransmission. Accordingly, the network may combine the first transmission and at least one previous transmission of the first data to decode the first data (i.e., perform a HARQ combining).

In one example, the network further configures (e.g., assigns) a second (e.g., usable) resource (e.g., MA resource, or time-frequency resource) for a second (e.g., next) transmission, if the first data is failed to be decoded. Accordingly, the network may receive a second data from the UE in the second transmission via the second resource. The first data and the second data may be the same data with different RVs.

Figure 5:
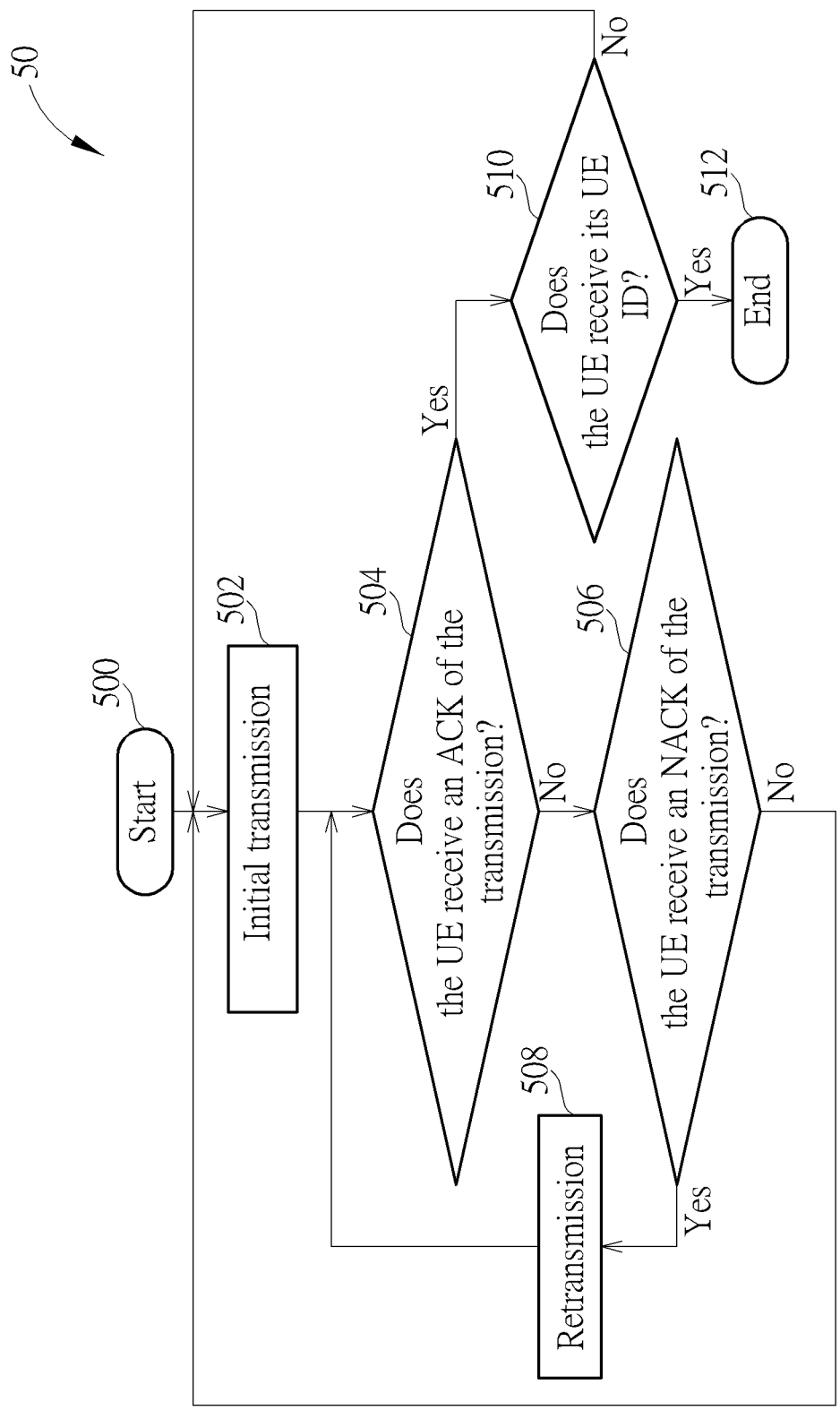
FIG. 5 is a schematic diagram of a grant-free procedure according to the example of the present invention.

FIG. 5 is a schematic diagram of a grant-free procedure according to the example of the present invention. 4 examples are illustrated in the FIG. 5. In one example: In Step 502, the UE performs an initial transmission including a RV 0 of data and a UE ID with a network via a resource x. In Step 504, the UE determines that an ACK of the initial transmission is not received. In Step 506, the UE determines that a NACK of the initial transmission is not received. The UE returns to Step 502 (i.e., repeats the initial transmission). In one example: In Step 502, the UE performs an initial transmission including a RV 0 of data and a UE ID with a network via a resource x. In Step 504, the UE determines that an ACK of the initial transmission is not received. In Step 506, the UE determines that an NACK of the initial transmission is received. In Step 508, the UE performs a retransmission including a RV 1 of the data and the UE ID with the network via a resource y corresponding to the resource x. The UE returns to Step 504 (i.e., determines an ACK of the retransmission).

In one example: In Step 502, the UE performs an initial transmission including a RV 0 of data and a UE ID with a network via a resource x. In Step 504, the UE determines that an ACK of the initial transmission is received. In Step

510, the UE determines that the UE ID is not received. The UE returns to Step 502 (i.e., repeats the initial transmission). In one example: In Step 502, the UE performs an initial transmission including a RV 0 of data and a UE ID with a network via a resource x. In Step 504, the UE determines that an ACK of the initial transmission is received. In Step 510, the UE determines that the UE ID is received. The UE goes to the Step 512 (i.e., the initial transmission is completed).

Figure 6:
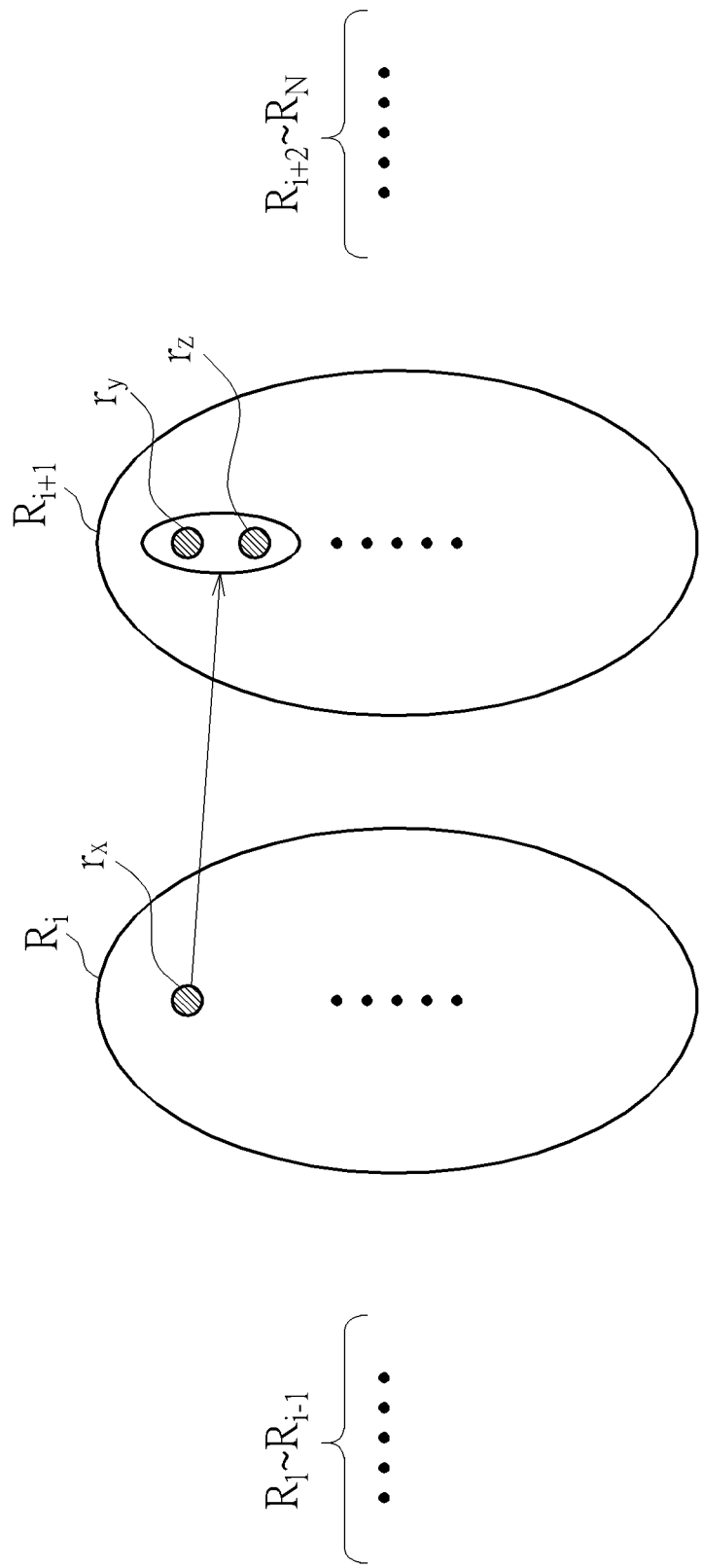
FIG. 6 is a schematic diagram according to the example of the present invention.

FIG. 6 is a schematic diagram according to the example of the present invention. N resource groups ($R_1 \sim R_N$) are used for N transmissions (first transmission, first retransmission, second retransmission, . . . , (N−1)th retransmission), wherein N is a positive integer. A resource x $r_x$ (e.g., the resource x in FIG. 5) is included in an ith resource group $R_i$ for an ith transmission, wherein i is a positive integer. A resource y $r_y$ (e.g., the resource y in FIG. 5) and a resource z $r_z$ are included in an (i+1)th resource group $R_{i+1}$ for an (i+1)th transmission. The resource $r_x$ is mapped to the resource $r_y$ and the resource $r_z$. That is, the resource $r_x$ in the resource group $R_i$ may be mapped to a plurality of resources in the resource group $R_{i+1}$. The resources and the correspondence between the resources may be pre-configured by the network. A sequence of RVs for a HARQ process may be {0, 2, 3, 1}. The UE performs the ith transmission including a RV 0 of data and a UE ID with the network via the resource $r_x$. Then, the UE receives a NACK of the ith transmission from the network via the resource $r_x$. The UE selects the resource $r_y$ randomly from the resource $r_y$ and the resource $r_z$, and performs the (i+1)th transmission including a RV 2 of the data and the UE ID with the network via the resource $r_y$.

The network may measure a SNR of the resource $r_y$ and a SNR of the resource $r_z$ via a RS. Then, the network may determine that the resource $r_y$ includes the (i+1)th transmission, when the SNR of the resource $r_y$ is higher than the SNR of the resource $r_z$. The network may decode the data by combining the ith transmission with the (i+1)th transmission. In one example, the network transmits a NACK of the (i+1)th transmission to the UE, if the network is failed to decode the data in the (i+1)th transmission. In one example, the network transmits an ACK of the (i+1)th transmission and the UE ID to the UE, if the network successfully decodes the data.

Figure 7:
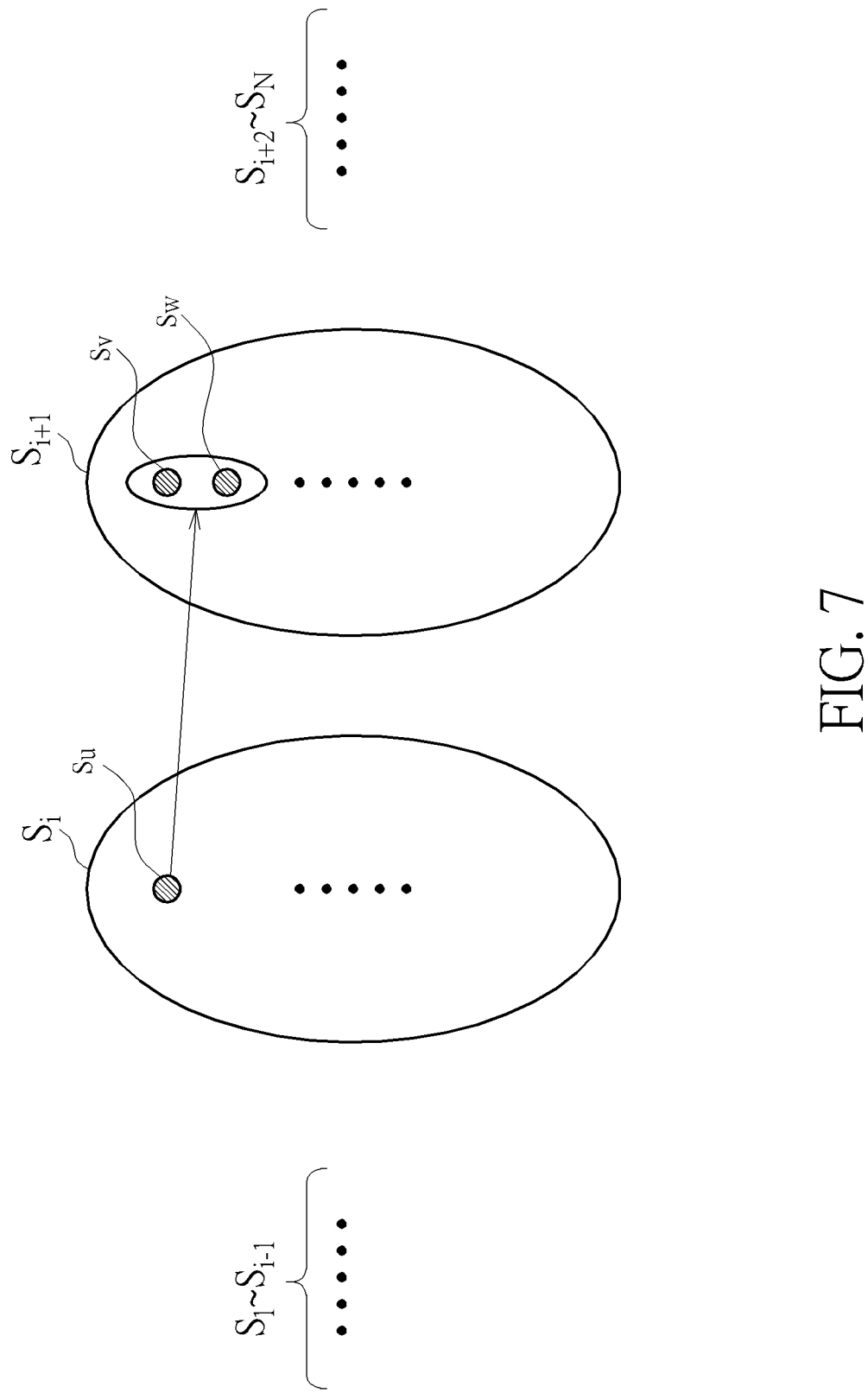
FIG. 7 is a schematic diagram according to the example of the present invention.

FIG. 7 is a schematic diagram according to the example of the present invention. N MA signature groups ($S_1 \sim S_N$) are used for N transmissions (first transmission, first retransmission, second retransmission, . . . , (N−1)th retransmission), wherein N is a positive integer. A MA signature U $s_u$ is included in a MA signature group $S_i$ for an ith transmission, wherein i is a positive integer. A MA signature V $s_v$ and a MA signature W $s_w$ are included in a MA signature group $S_{i+1}$ for an (i+1)th transmission. The MA signature $s_u$ is mapped to the MA signature $s_v$ and the MA signature $s_w$. That is, the MA signature $s_u$ in the MA signature group $S_i$ may be mapped to a plurality of MA signatures in the MA signature group $S_{i+1}$. The MA signatures and the correspondence between the MA signatures may be pre-configured by the network. A first time-frequency resource used for the ith transmission may be pre-configured by the network. A sequence of RVs for a HARQ process may be {0, 2, 3, 1}. The UE performs the ith transmission including a RV 0 of data and a UE ID with a network via the first time-frequency resource and the MA signature $s_u$. Then, the UE receives an NACK of the MA signature $s_u$ in the ith transmission and is configured (e.g., dynamically) a second time-frequency resource available for the (i+1)th transmission from the network. In one example, the UE may select the MA signature $s_v$ randomly from the MA signature $s_v$ and the MA signature $s_w$, and performs the (i+1)th transmission including a RV 2 of the data and the UE ID with the network via the MA signature $s_v$ and the second time-frequency resource.

The network may measure a SNR of the MA signature $s_v$ and a SNR of the MA signature $s_w$ via a RS. Then, the network may determine that the MA signature $s_v$ includes the (i+1)th transmission, when the SNR of the MA signature $s_v$ is higher than the SNR of the MA signature $s_w$. The network may decode the data by combining the ith transmission with the (i+1)th transmission. In one example, the network transmits an NACK of the MA signature $s_v$ of the (i+1)th transmission and configures a time-frequency resource available for the (i+2)th transmission to the UE, if the network is failed to decode the data. In one example, the network transmits an ACK of the MA signature $s_v$ of the (i+1)th transmission and the UE ID to the UE, if the network successfully decodes the data.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and related communication device for handling transmissions. Thus, the UE knows how handle the transmission with the network. As a result, the problem of transmission(s) between the UE and the network is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling transmissions, comprising:
  a storage device; and
  a processing circuit, coupled to the storage device, wherein the storage device stores instructions, and the processing circuit is configured to execute the instructions of:
    performing a first transmission comprising a first data and an identity of the communication device with a network via a first resource; and
    performing a second transmission comprising a second data and the identity of the communication device with the network via a second resource;
    wherein the second transmission is a retransmission of the first transmission, if the communication device receives a negative acknowledgement (NACK) of the first transmission from the network;
    wherein the first resource is comprised in a first resource group corresponding to the first transmission, and the second resource is comprised in a second resource group corresponding to the second transmission;

wherein the first resource has a correspondence with at least one resource in the second resource group.

2. The communication device of claim 1, wherein a first redundancy version (RV) of the first data is corresponding to the first transmission, and a second RV of the second data is corresponding to the second transmission.

3. The communication device of claim 1, wherein the correspondence is configured by the network via system information or a radio resource control (RRC) message.

4. The communication device of claim 1, wherein the second resource is selected by the communication device from at least one resource in the second resource group randomly, wherein the at least one resource is mapped by the first resource.

5. The communication device of claim 1, wherein the first resource group and the second resource group are configured by the network via system information or a RRC message.

6. The communication device of claim 1, wherein the first resource group is corresponding to a first RV, and the second resource group is corresponding to a second RV.

7. The communication device of claim 1, wherein the second resource is configured by the network via the NACK of the first transmission or a physical downlink control channel (PDCCH).

8. The communication device of claim 1, wherein the second transmission is an initial transmission, if the communication device does not receive an acknowledgement (ACK) of the first transmission and does not receive a NACK of the first transmission from the network.

9. The communication device of claim 8, wherein the first transmission is the initial transmission.

10. The communication device of claim 9, wherein a first RV of the first data and a second RV of the second data are corresponding to the initial transmission.

11. The communication device of claim 9, wherein the first resource and the second resource are corresponding to the initial transmission.

12. The communication device of claim 1, wherein the second transmission is an initial transmission, if the communication device receives an ACK of the first transmission from the network and does not receives the identity of the communication device from the network.

13. The communication device of claim 12, wherein the first transmission is the initial transmission.

14. The communication device of claim 13, wherein a first RV of the first data and a second RV of the second data are corresponding to the initial transmission.

15. The communication device of claim 13, wherein the first resource and the second resource are corresponding to the initial transmission.

16. The communication device of claim 1, wherein the second transmission is a new transmission different from the first transmission, if the communication device receives an ACK of the first transmission and the identity of the communication device from the network.

17. The communication device of claim 16, wherein the first data and the second data are different data, and the first resource and the second resource are corresponding to different transmissions.

18. The communication device of claim 16, wherein the identity of the communication device is comprised in the ACK of the first transmission, is encoded with the ACK of the first transmission, or is transmitted separately from the ACK of the first transmission.

19. The communication device of claim 1, wherein the identity of the communication device is configured by the network.

* * * * *